Figure 1:
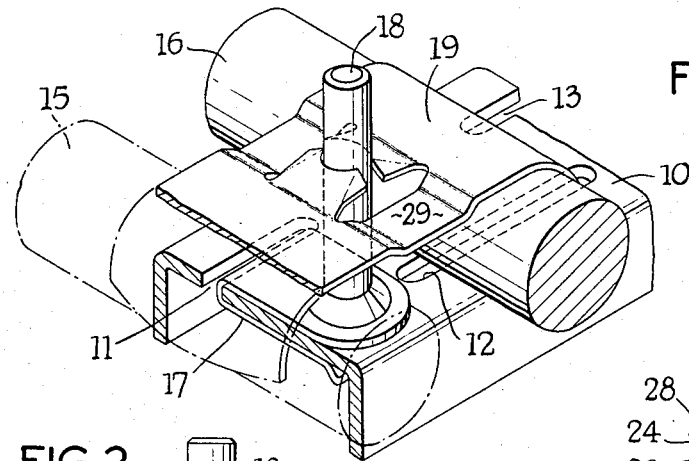

May 11, 1965  C. A. SECKERSON  3,182,939

FASTENER

Filed May 6, 1963

Inventor,
CLIFFORD A. SECKERSON.
by Walter I. Jones
Attorney.

United States Patent Office 3,182,939
Patented May 11, 1965

3,182,939
FASTENER
Clifford Alexander Seckerson, Iver Heath, England, assignor to Societe A. Raymond, Grenoble, France, a corporation of France
Filed May 6, 1963, Ser. No. 278,214
Claims priority, application Great Britain, May 9, 1962, 17,884/62
1 Claim. (Cl. 248—73)

The present invention relates to an improved fastener.

A known form of fastener at present in common use consists of a base-plate, or head, of sheet metal to which is fixed a pin or rod extending normally away from the base-plate and a separate clamp, or foot, also of sheet metal, which is formed with a hole into which extends a pair of spaced teeth which are bent out of the plane of the clamp on the same side.

This known fastener is used to fasten two apertured members together by passing the rod through the two apertures, so that the base-plate butts against one of them, and then pushing the clamp over the free end of the rod until it butts against the other member. The teeth are such that the clamp can be pushed over the rod towards the base-plate, but cannot easily be withdrawn over the rod away from the base-plate.

It follows that although the members can be very quickly clamped together, much more quickly than with a nut and bolt for example, they cannot be unfastened except with the use of considerable force and at the risk of breaking the fastener.

It is an object of the present invention to provide, in a fastener of this kind, means whereby the clamp may be released from the rod so that the fastener can be disassembled and the member separated.

Another object is to provide a suitable pliers with the aid of which the fastener may be easily and quickly released.

Yet another object is so to shape the fastener and the pliers that the latter may be engaged with the former in such a way as to effect release of the fastener without fear of damage to the fastener.

With this end in view, and in accordance with the invention, there is provided a fastener for holding a member to a support, comprising a rod, a base-plate integral or fixed to the rod and a resilient clamp movable over the rod, the clamp being formed with a hole which may be threaded over the pin into which hole projects a pair of longitudinally directed spaced teeth which are bent out of the general plane of the clamp so as to permit the rod to pass through the hole when the clamp is moved towards the base-plate but prevent or hinder movement of the rod when the clamp and base-plate are urged relatively apart, wherein the clamp is formed, underneath the teeth, with a depression having its concave side facing the teeth.

Preferably the longitudinal edges of each tooth are bent out of the general plane of the tooth towards the concave side of the depression.

Figure 2:
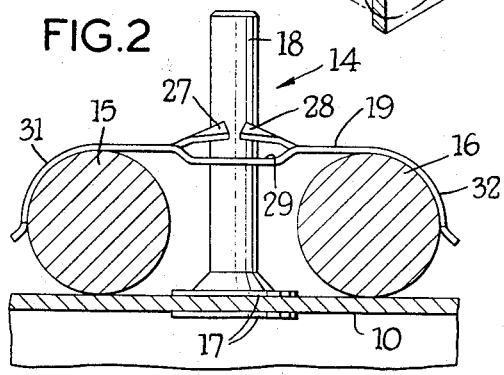
Figure 4:
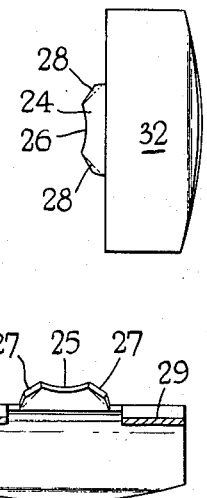
Figure 5:
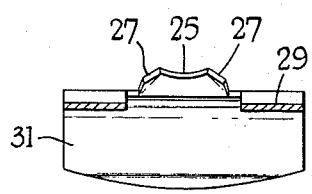
Figure 3:
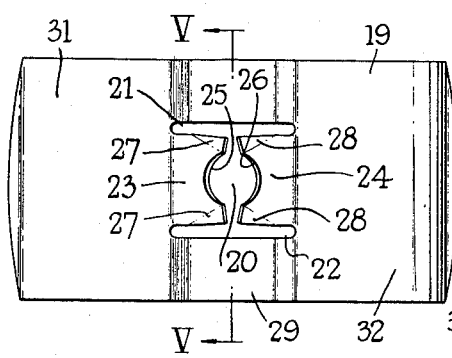
Figure 6:
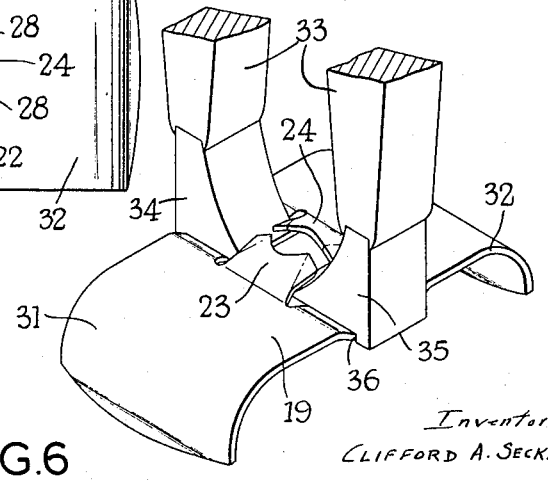

Preferred forms of the invention will now be described with reference to the accompanying diagrammatic drawings, in which:

FIGURES 1 and 2 are respectively a perspective view and front elevation of an assembly of two cables held to an apertured support with the aid of a fastener, FIGURES 3 and 4 are respectively a plan and an elevation of a clamp, forming part of the fastener shown in FIGURES 1 and 2, FIGURES 5 is a section on the line V—V of FIGURE 3, and FIGURE 6 is a perspective view showing how a pliers may be used to release the clamp.

At 10 in FIGURES 1 and 2 is shown a support of sheet metal formed with a series of elongate holes such as 11, 12 and 13. Held to the support with the aid of a fastener indicated generally at 14 is a pair of cables 15 and 16.

The fastener consists essentially of three parts, namely, a head or base-plate 17 which is of U-shape, a pin or rod 18 fixed in any convenient way to the base-plate, and a separate clamp 19.

The clamp is formed by shearing and bending sheet material to the shape shown in the figures. The blank from which it is formed may be roughly rectangular in shape. Out of the blank is punched a hole 20 running into a pair of slots 21 and 22. Between the hole and slots are formed a pair of teeth 23 and 24. It will be seen that the adjacent transverse free ends of the teeth are spaced a little and that these ends are notched as at 25 and 26. The teeth are bent a little, out of the general plane of the clamp, so that they lie on the same side thereof. The longitudinal edges 27 and 28 respectively of the two teeth are also bent down towards the general plane of the clamp.

Underneath the teeth the clamp is formed with a depression in the form of a transverse trough 29 and the two ends of the clamp are bent to form part-cylindrical flanges 31 and 32 respectively.

It will be seen that the longitudinal edges of each tooth are bent out of the general plane of the tooth towards the concave side of the depression.

The fastener is used in the following way in order to secure the two cables 15 and 16 to the support 10:

First the U-shaped base-plate 17 is threaded through one of the holes in the support, as illustrated through the hole 11, the distance between the two limbs of the U being such that the base-plate resiliently grips an edge of the support in the hole 11.

Then the two cables are laid in parallel position across the support 10 and the clamp 19 is threaded over the rod 18 and pushed down over the rod until the two cables are cradled in the two flanges 31 and 32.

During this operation the teeth 23 and 24 splay apart a little and slide down the rod 18, but it will be found well-nigh impossible to reverse this process and slide the clamp up over the rod, owing to the inclination of the teeth.

The longitudinal edges 27 and 28 of the teeth 23 and 24 are turned down, in the manner described above, in order that the teeth may be easily separated for removal of clamp from the rod. This is achieved with the aid of a pliers 33 of the kind shown in FIGURE 6.

It will be seen that the pliers comprise two jaws 34 and 35 each of which is of wedge-shape with the apex of the wedge parallel with axis of pivoting of the jaws. The underface of each jaw is formed with a shoulder such as that shown at 36. The purpose of the shoulders is to prevent the jaws of the pliers from being squeezed together so far as to break the teeth 23 and 24. The jaws must come together sufficiently far to lift the teeth a little but not so far as to break them.

In use the pliers are applied to the clamp, from above, so that the wedge-shaped jaws pass under the longitudinal flanged edges 27 and 28 of the teeth, the trough 29 providing space for the jaws of the pliers. When the pliers are squeezed the teeth 23 and 24 are raised a little to free them from the rod, whereupon the clamp can be lifted, by the pliers, off the rod 18, so as to release the fastener and the cables.

If desired two clamps may be used on the same rod, with one pair of cables under the inner clamp and a second pair of cables between the inner and outer clamps. In this case the fact that the longitudinal edges of the teeth are turned down prevents these edges from chafing the outer pair of cables, whilst the transverse channel 29 provides room for the jaws of the pliers to be applied to each clamp.

The shoulders such as 36 prevent the pliers being squeezed so tightly as to damage the fastener.

The base-plate may take any of the well-known variety of forms whereby it may be attached to a support. Similarly the clamp may be a simple plate, without flanges, or may be used to hold any member to the support. If desired, the rod may be of any suitable non-circular section, and may be serrated to give a more positive grip.

What I claim is:

A fastener for holding a member to a support, comprising a rod, a resilient base plate integral with and affixed to the rod and a resilient clamp movable over the rod, said clamp comprising a base portion having a median portion and a pair of end portions joined by said median portion, said median portion having a pair of teeth formed from material thereof, said teeth bent upward from said median portion and having longitudinal flanged edges and the remaining portion of said median portion being depressed to form a rectangular trough, said flanged ends of said teeth facing one another and said teeth formed to permit the rod to pass through a hole formed by the flanged ends of said teeth whereby when the clamp is moved toward the base plate the rod may be passed through said hole.

References Cited by the Examiner
UNITED STATES PATENTS

| | | | |
|---|---|---|---|
| 1,759,417 | 5/30 | Rabsilber | 248—51 |
| 1,888,342 | 11/32 | Anderson | 248—68 |
| 2,279,169 | 4/42 | Kost | 85—36 |
| 2,445,606 | 7/48 | Davis | 248—226 |
| 2,517,411 | 8/50 | Patterson. | |
| 2,562,671 | 7/51 | Kois | 248—226 X |
| 2,615,759 | 10/52 | Becker | 85—36 X |
| 2,700,910 | 2/55 | Van Niel | 81—5.1 |
| 2,802,382 | 8/57 | Adams et al. | 81—3.04 |
| 2,867,142 | 1/59 | Hutchins | 81—3.04 |
| 2,915,927 | 12/59 | De Genova | 81—3.04 |
| 3,066,902 | 12/62 | Conil | 248—223 |

CLAUDE A. LE ROY, *Primary Examiner.*